US010710752B2

(12) United States Patent
Georgeson (10) Patent No.: US 10,710,752 B2
(45) Date of Patent: Jul. 14, 2020

(54) SYSTEM AND METHOD FOR INSPECTING AIRCRAFT WINDOWS

(71) Applicant: The Boeing Company, Chicago, IL (US)

(72) Inventor: Gary Ernest Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 87 days.

(21) Appl. No.: 16/162,287

(22) Filed: Oct. 16, 2018

(65) Prior Publication Data

US 2020/0115068 A1    Apr. 16, 2020

(51) Int. Cl.
| | | |
|---|---|---|
| G01N 21/00 | (2006.01) | |
| B64F 5/60 | (2017.01) | |
| G01N 21/958 | (2006.01) | |
| G01N 21/88 | (2006.01) | |
| G01N 21/21 | (2006.01) | |

(52) U.S. Cl.
CPC ............. *B64F 5/60* (2017.01); *G01N 21/21* (2013.01); *G01N 21/8806* (2013.01); *G01N 21/958* (2013.01); *G01N 2021/8848* (2013.01); *G01N 2021/9586* (2013.01); *G01N 2201/0683* (2013.01)

(58) Field of Classification Search
CPC .............. G01N 21/958; G01N 21/896; G01N 2021/9586; G01N 21/8803; G01M 11/00
USPC ....................................................... 356/239.1
See application file for complete search history.

(56) References Cited

U.S. PATENT DOCUMENTS

| | | | |
|---|---|---|---|
| 8,917,312 B1 | 12/2014 | Gleason et al. | |
| 2005/0122308 A1* | 6/2005 | Bell .................... | G06F 3/011 345/156 |
| 2007/0216536 A1* | 9/2007 | Alfano .................. | B64D 15/20 340/583 |
| 2013/0071103 A1* | 3/2013 | Harris ................... | G02B 27/28 396/544 |

(Continued)

OTHER PUBLICATIONS

Martinek, Klaus-Peter, "Quality as Clear as Glass—Polarizing Microscopy in Glass Production", Leica Microsystems, URL: https://www.leica-microsystems.com/science-lab/quality-assurance/quality-as-clear-as-glass-polarizing-microscopy-in-glass-production/, Apr. 18, 2008, 9 pages.

(Continued)

*Primary Examiner* — Md M Rahman
(74) *Attorney, Agent, or Firm* — Kolisch Hartwell, P.C.

(57) ABSTRACT

A system and method are provided for inspecting an aircraft window for anomalies by directing light that is polarized at a first angle at the window and analyzing light emerging from the window. The light emerging from the window may be polarized at a second angle. One or both of the angles may be adjustable and, in a nominal position, the second angle may be rotated about 90-degrees relative to the first angle. A camera may record the light as polarized at the first and second angles. For a window installed on an aircraft, a vacuum hood may produce a pressure on the window. An analysis subsystem may be coupled to the camera to receive and analyze the image from the camera of light as polarized at the first and second angles. The analysis subsystem may use a database of information relating to light patterns for anomalous and non-anomalous windows.

20 Claims, 6 Drawing Sheets

(56) References Cited

U.S. PATENT DOCUMENTS

2017/0115160 A1* 4/2017 Fest ..................... B64C 1/1484

OTHER PUBLICATIONS

Quinvision, "Quality in Vision for automatic measuring of stress and blisters in glass" URL: www.quinvision.com/stress%20measuring%20methods%20intensity.htm, circa before Jul. 31, 2018, 2 pages.

Quinvision, "Quality in Vision for automatic measuring of stress and blisters in glass" URL: www.quinvision.com/stress%20measuring.html, circa before Jul. 31, 2018, 1 page.

Quinvision, "Principle of measuring Stress in Glass" URL: www.quinvision.com/stress%20measuring%20principle.html, circa before Jul. 31, 2018, 2 pages.

Quinvision, "Methods for measuring of stress in glass" URL: www.quinvision.com/stress%20measuring%20methods.html, circa before Jul. 31, 2018, 1 page.

Quinvision, "Compensator method for measuring of stress in glass" URL: www.quinvision.com/stress%20measuring%20methods%20compensator.html, circa before Jul. 31, 2018, 1 page.

Quinvision, "Senarmont Method for measuring of stress in glass" URL: www.quinvision.com/stress%20measuring%20methods%20senarmont.html, circa before Jul. 31, 2018, 1 page.

Quinvision, "Lambda Plate Method for measuring of stress in glass" URL: http://quinvision.com/stress%20measuring%20methods%20lambda%20plate.html, circa before Jul. 31, 2018, 1 page.

Quinvision, "Intensity Method for measuring of stress in glass" URL: www.quinvision.com/stress%20measuring%20methods%20intensity.html, circa before Jul. 31, 2018, 2 pages.

Fermum, Lars, Inspecting Transparent Objects, Stemmer Imaging GmbH, URL:https://www.stemmer-imaging.com/media/uploads/sis/ST/STEMMER-IMAGING-EN-Inspecting-transparent-objects.pdf, circa before Oct. 16, 2018, 19 pages.

* cited by examiner

SYSTEM AND METHOD FOR INSPECTING AIRCRAFT WINDOWS

FIELD

This disclosure relates to systems and methods for inspecting aircraft windows for anomalies. More specifically, the disclosed embodiments relate to a system and method for using a polarized light source to reveal a stress pattern for the window and to analyze the stress pattern to determine the presence of any anomalies in the window.

BACKGROUND

Windows installed on aircraft are subject to repeated temperature and pressure cycling as the aircraft climbs to cruising altitude and is pressurized and then descends for landing and is depressurized. A window may have one or more anomalies, such as inclusions present from manufacturing and/or nicks or scratches incurred during operation. Such anomalies can impact appearance or performance of aircraft window. Early detection of anomalies may ensure that their impact is minimized. One example of inclusions are zirconium crystals, which are typically tiny (e.g., about 0.005 inches in length) and clear, so they are difficult to detect with traditional optical methods. An anomaly may grow larger over time and operational cycles, and detecting and dealing with small anomalies is the preferable approach.

SUMMARY

Embodiments of the present disclosure provide a system for inspecting an aircraft window installed on an aircraft with an interior surface of the window in the aircraft interior and an exterior surface at the aircraft exterior. The system for inspection may include an interior subsystem operable in the aircraft interior. The interior subsystem may include a light source and an interior polarizer, and the light source and interior polarizer may be operable to direct light at the interior surface of the window with the light polarized at a first angle. The system may further include an exterior subsystem operable adjacent the aircraft exterior. The exterior subsystem may include an exterior polarizer that may be operable for polarizing light from the exterior surface of the window at a second angle. The polarizer of the exterior subsystem may be operable in a nominal position in which the second angle is rotated relative to the first angle. The light source may produce light with sufficient intensity to shine through the exterior surface of the window and to produce an image at the exterior polarizer. The second angle may be rotated about 90-degrees relative to the first angle.

The exterior subsystem may include a camera directed at the exterior polarizer, which may record the image at the exterior polarizer produced by the light passing through the first polarizer, the window, and the second polarizer. The exterior subsystem may include a vacuum hood encompassing the exterior polarizer, which may be operable to produce a negative pressure at the exterior surface of the window. The negative pressure may be any range suitable to the aircraft, the window, and the particular application of the system and typically is in a range of at least about one pound per square inch (PSI) up to about two PSI. The interior and exterior subsystems may also be operable while the aircraft is pressurized to an appropriate level, e.g., at least about one PSI.

The exterior subsystem may include a measurement tool between the exterior surface of the window and the exterior polarizer. The measurement tool may be operable to measure the intensity of light shining through the exterior surface of the window.

The system may be for use with an aircraft window that defines a main stress axis. The interior polarizer may be operable to polarize light at about 45-degrees relative to the main stress axis. One or both of the interior polarizer and the exterior polarizer may be rotatable about an axis perpendicular to the surfaces of the window to change the respective first and second angles of polarization of light.

Embodiments of the present disclosure also provide a system for inspecting the aircraft window installed on the aircraft with the aircraft window defining an interior surface and an exterior surface substantially parallel to the interior surface. The system may include an interior subsystem operable in the aircraft interior. The interior subsystem may include a light source and an interior polarizer, which may be operable to direct polarized light at the interior surface of the window with sufficient intensity to shine through the exterior surface of the window. The interior polarizer may be operable to polarize light at a first angle. The system may include an exterior subsystem operable adjacent the aircraft exterior. The exterior subsystem may include an exterior polarizer and a camera. The exterior polarizer may be operable for polarizing light from the exterior surface of the window at a second angle. The camera may be directed at the exterior polarizer to receive an image produced by the polarized light passing through the exterior polarizer. The polarizer of the exterior subsystem may be operable in a nominal position in which the second angle is rotated about 90-degrees relative to the first angle.

A system with the camera may further include an analysis subsystem coupled to the camera. The analysis subsystem may be operable to receive and to analyze the image from the camera of light passing through the exterior polarizer. The analysis subsystem may use a database of information relating to light patterns for anomalous and non-anomalous windows. The exterior subsystem may also include a vacuum hood encompassing the exterior polarizer and the camera. The vacuum hood may operable to produce a negative pressure at the exterior surface of the window. The negative pressure may be any range suitable to the aircraft, the window, and the particular application of the system and typically is in a range of at least about one pound per square inch (PSI) up to about two PSI. The interior and exterior subsystems may also be operable while the aircraft is pressurized to an appropriate level, e.g., at least about one PSI. One or both of the interior polarizer and the exterior polarizer may be rotatable about an axis perpendicular to the surfaces of the window to change the respective first and second angles of polarization of light.

In some embodiments, a method for carrying out inspection of an aircraft window installed on an aircraft, where the aircraft has an interior and an exterior, and the window has an interior surface in the aircraft interior and an exterior surface at the aircraft exterior, may include the steps of:

a. providing in the aircraft interior a source of light polarized at a first angle and directed at the interior surface of the aircraft window;

b. providing exterior to the aircraft an exterior polarizer, the exterior polarizer positioned adjacent the exterior surface of the window and operable for polarizing light from the exterior surface of the window at a second angle;

c. positioning the polarized light source and the polarizer relative to one another so that the second angle is rotated about 90-degrees relative to the first angle;

d. directing the polarized light source at the interior surface of the window with sufficient intensity to shine through the exterior surface of the window and to produce an image of the window at the exterior polarizer;

e. analyzing the image of the window to detect any anomalies in the window.

In some embodiments, a method may also include a step of creating a negative pressure relative to the interior of the aircraft adjacent the exterior surface of the window. The negative pressure may be at least about one pound per square inch (PSI). The step of creating the negative pressure may also include varying the negative pressure repeatedly. The step of analyzing the image may include analyzing changes in the image during the varying of the negative pressure.

In some embodiments, a method may include steps of providing a camera adjacent to the exterior polarizer; directing the camera at the image at the exterior polarizer; and recording the image with the camera. The step of analyzing the image may include analyzing the image as recorded by the camera. The step of analyzing the image may include providing the image to a computer configured with software for locating any anomalies in the window. The method may also include a step of developing a pre-determined threshold for the window and the step of analyzing the image may include comparing the image to the threshold for the window. The method may also include a step of developing a pre-determined nominal score for the window and the step of analyzing the image includes comparing the image to the nominal score for the window. The step of analyzing the image may also include placing the window on a watch list if the image is above the nominal score but below the threshold.

In some embodiments, a method may provide for the polarizer adjacent the aircraft exterior to be polarized glasses. The step of analyzing the image may include a person looking at the image through the polarized glasses.

In some embodiments, a method may include a step, during the step of directing the polarized light source at the interior surface of the window, of rotating at least one of the interior polarizer and the exterior polarizer about an axis perpendicular to the surfaces of the window to change at least one of the first and second angles of polarization of light.

Features, functions, and advantages may be achieved independently in various embodiments of the present disclosure, or may be combined in yet other embodiments, further details of which can be seen with reference to the following description and drawings.

DESCRIPTION

Various aspects and examples of a system and method for inspection of aircraft windows are described below and illustrated in the associated drawings. Unless otherwise specified, a combined system and/or its various components may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Figure 1:
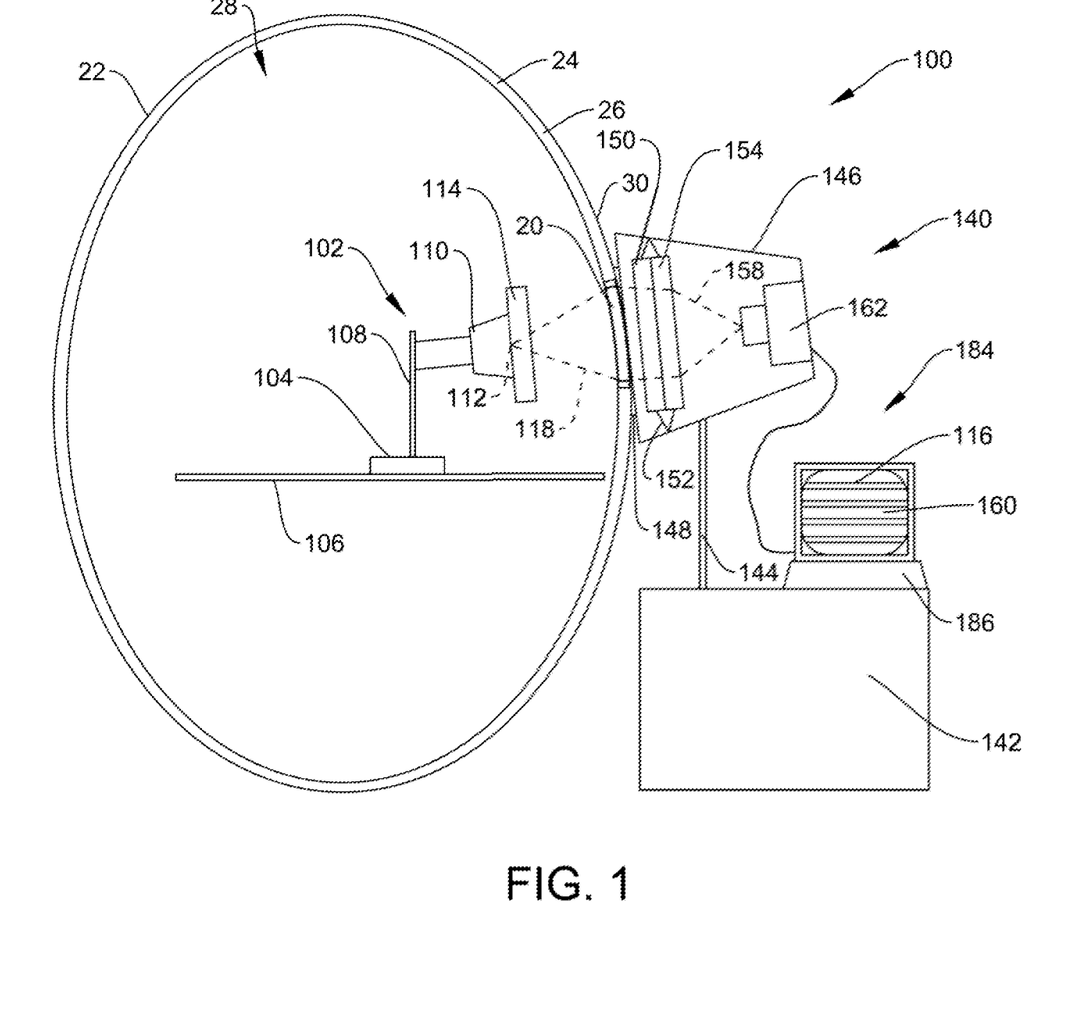
FIG. 1 is a cross-sectional view of an aircraft cabin depicting an embodiment of the present disclosure including a light source and polarizer in the interior directing light at the interior surface of a window, and the light shining through the window to a measurement tool and another polarizer encompassed by a vacuum hood on the aircraft exterior, with a camera, focused on the exterior polarizer, coupled to a computer for analysis of the image on the exterior polarizer.
Figure 2:
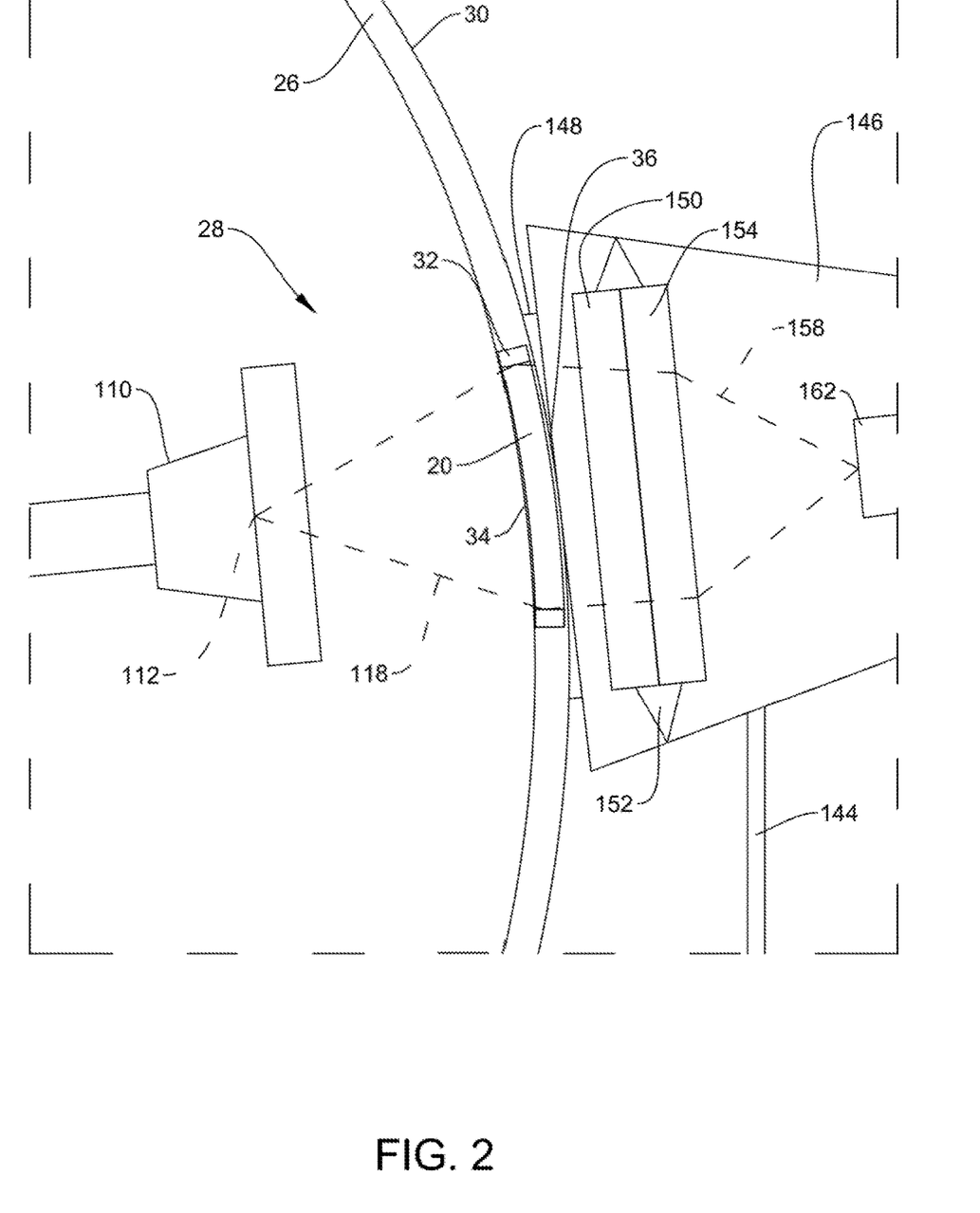
FIG. 2 is a cross-sectional, blown-up view of the aircraft cabin and part of the system as depicted in FIG. 1.

As shown in FIGS. 1 and 2, a system 100 in accordance with one or more embodiments of the present invention, may be used for inspecting a transparent structure such as a window 20. Typically, window 20 is installed in a vehicle, such as an aircraft 22 with an airframe 24 including a fuselage 26 defining an interior 28 and an exterior 30. Window 20 may be any window in the aircraft such as a windshield or a passenger window and may be mounted in a frame 32, e.g., in fuselage 26. Window 20 typically has an interior surface 34 facing into aircraft interior 28 and an exterior surface 36 at aircraft exterior 30. Interior surface 34 of window 20 may be parallel to exterior surface 36 or may have another configuration. Window 20 may include a single pane or two or more panes, and multiple panes may be separated by one or more gas-filled space(s).

An anomaly as discussed above may produce stress in the area of the window surrounding the anomaly. Inspection methods that measure birefringence may be used to quantify stress in a transparent structure such as a window made of glass, acrylic, polycarbonate, or other transparent material. The stress can be measured due to the birefringence of the material under stress. Birefringence means that a material has different indexes of refraction in different directions. Some transparent materials, such as glass, typically have only a single index of refraction in all directions, but when a force is acting on the glass, applying stress, the glass is deformed. The deformation elongates the glass proportional to the force. This changes the index of refraction and the change in the index is proportional to the applied force.

A glass window pane may be seen as a three-dimensional structure with a surface of the pane defining the X and Y axes and the thickness of the pane, perpendicular to the surface, being the Z axis. Visible light, like other electromagnetic radiation, propagates as a transverse wave, so, light shining through the pane, i.e., traveling along the Z axis, oscillates in the X and Y axes. An anomaly or another point of stress for the pane typically produces stress, deformation, and elongation in the X and Y directions in the glass. The difference in stress in the X and Y directions affects the length of the optical path through the glass in the Z direction. Polarized light can make visible the differences in the optical path, revealing stresses in the glass, in a manner as described below.

System 100 may include an interior subsystem 102 operable in aircraft interior 28. Interior subsystem 102 may include a mounting structure 104 adjacent to one or more of the aircraft's windows. Typically mounting structure 104 of interior subsystem 102 is movable within the aircraft interior to successive positions adjacent some or all of the aircraft's windows. Mounting structure 104 may include a base 106 and an adjustable stand 108, as suited to the interior of the particular types of aircraft in which the system is used.

Figure 5:
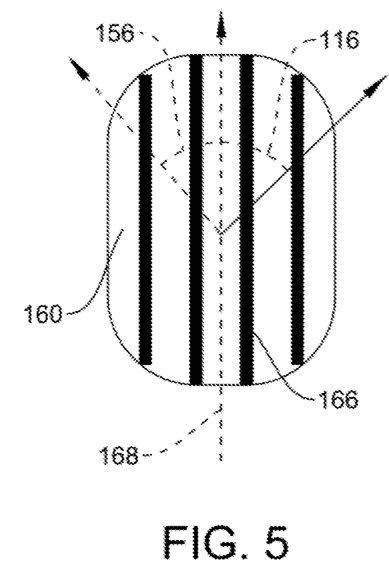
FIG. 5 is an illustration of an image, produced by cross-polarized light using an embodiment of the present disclosure, of a window not depicting any anomalies and showing a typical non-pressurized stress pattern, with generally straight, wide-spaced, uniform lines revealing a main stress axis, in this example a vertical main stress axis.

Stand 108 may support a light source 110 that may be positioned adjacent window 20 and may be capable of directing light 112 in the direction of window 20. A polarizer 114 may be part of interior subsystem 102 and may be coupled to stand 108 and/or light source 110. Interior polarizer 114 may be adjustable in position and rotation relative to light source 110 and window 20. Alternatively, light source 110 may be capable of producing light 112 that is polarized at a fixed or adjustable angle. Typically, light source 110 and interior polarizer 114 are operable to direct light at interior surface 34 of window 20 with light 112 polarized at a first angle 116 (FIG. 5).

As seen in FIGS. 1-4, light 112 from light source 110 passes through interior polarizer 114, emerging as singly-polarized light 118, which strikes interior surface 34 of window 20. Light 118 passes through window 20 and emerges from exterior surface 36 where it can be further measured, polarized, and/or analyzed.

System 100 may include an exterior subsystem 140 operable adjacent aircraft exterior 30. Exterior subsystem 140 may include a support structure, such as a platform 142 and a mounting structure, such as stand 144. Platform 142 and stand 144 may be movable and adjustable in position.

Exterior subsystem 140 may include a vacuum hood 146, which may include a seal, such as gasket 148 for creating a seal between hood 146 and aircraft exterior 30 that is sufficiently airtight for operating in pressure ranges suitable for operation of system 100. For example, vacuum hood 146 may be coupled to a vacuum source (not shown) and may be operable to produce a negative pressure at exterior surface 36 of window 20. Vacuum hood 146 may simulate on the ground the pressure that window 20 experiences during flight by creating a pressure differential from the ambient pressure in the cabin to a negative pressure within space defined by the hood and the portion of aircraft exterior surface 36 that is covered by the hood. The negative pressure may be any range suitable to the aircraft, the window, and the particular application of system 100, and typically is in a range of at least about one pound per square inch (PSI) up to about two PSI, and may be operational to a higher range of about six to about nine PSI. Alternatively or in addition, interior subsystem 102 and exterior subsystem 140 may be operable while interior 28 of aircraft 22 is pressurized by onboard aircraft systems. Such systems typically can pressurize the cabin to about four to about nine PSI above ambient pressure, and an appropriate level of pressurization for the operations described herein is at least about one PSI above ambient pressure.

Exterior subsystem 140 may include a measurement tool 150, which may be mounted in vacuum hood 146 with a suitable support structure 152. Measurement tool 150 may be operable to measure the intensity of light 118 shining through exterior surface 36 of window 20. Measurement tool 150, if used, may be of any suitable type, which are further discussed below. System 100 may also be operable without any measurement tool.

Exterior subsystem 140 may include an exterior polarizer 154 that may be operable for further polarizing light 118 emerging from exterior surface 36 of window 20. Exterior polarizer 154 may be rotated to a second angle 156 for polarizing the incoming light 118 (FIG. 5) and to pass through as double-polarized light 158. Exterior polarizer 154 may be movable in position and rotatable to adjust second angle 156 relative to first angle 116. Exterior polarizer 154 may be supported by structure 152 and/or another suitable mount.

Typically, exterior polarizer 154 is at least nominally positioned to cross-polarize light 118. That is, second angle 156 may nominally be offset about 90° from first angle 116. The result of such cross-polarization, if interior 114 and exterior 154 polarizers were ideal (and in the absence of the window 20 and measurement tool 150), would be to reduce the intensity of light 158 emerging from exterior polarizer 154 to zero. However, actual polarizers are not ideal and the presence of the window 20 is expected to have an effect. The effects of the measurement tool are discussed below.

Light source 110 typically produces light with sufficient intensity to shine through interior polarizer 114, window 20, measurement tool 150, if present, and exterior polarizer 154, and to produce an image 160 at exterior polarizer 154. Light 158 emerging from exterior polarizer 154 may be detected by a camera 162, which may be mounted to vacuum hood 146 or otherwise suitably mounted for operation.

Figure 3:
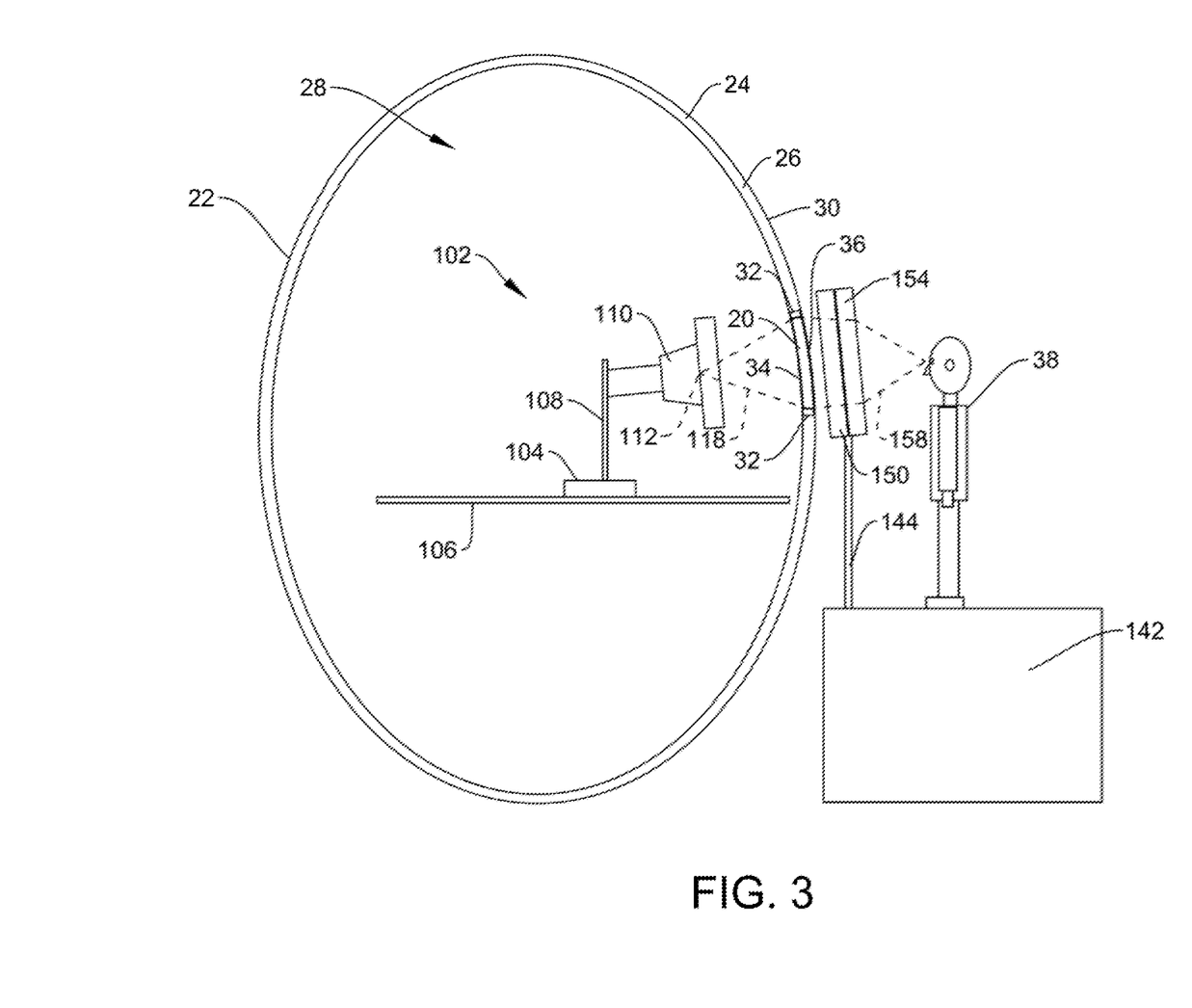
FIG. 3 is a cross-sectional view of an aircraft cabin depicting an embodiment of the present disclosure including a light source and polarizer in the interior directing light at the interior surface of a window, and the light shining through the window to a measurement tool and another polarizer being viewed by a person.
Figure 4:
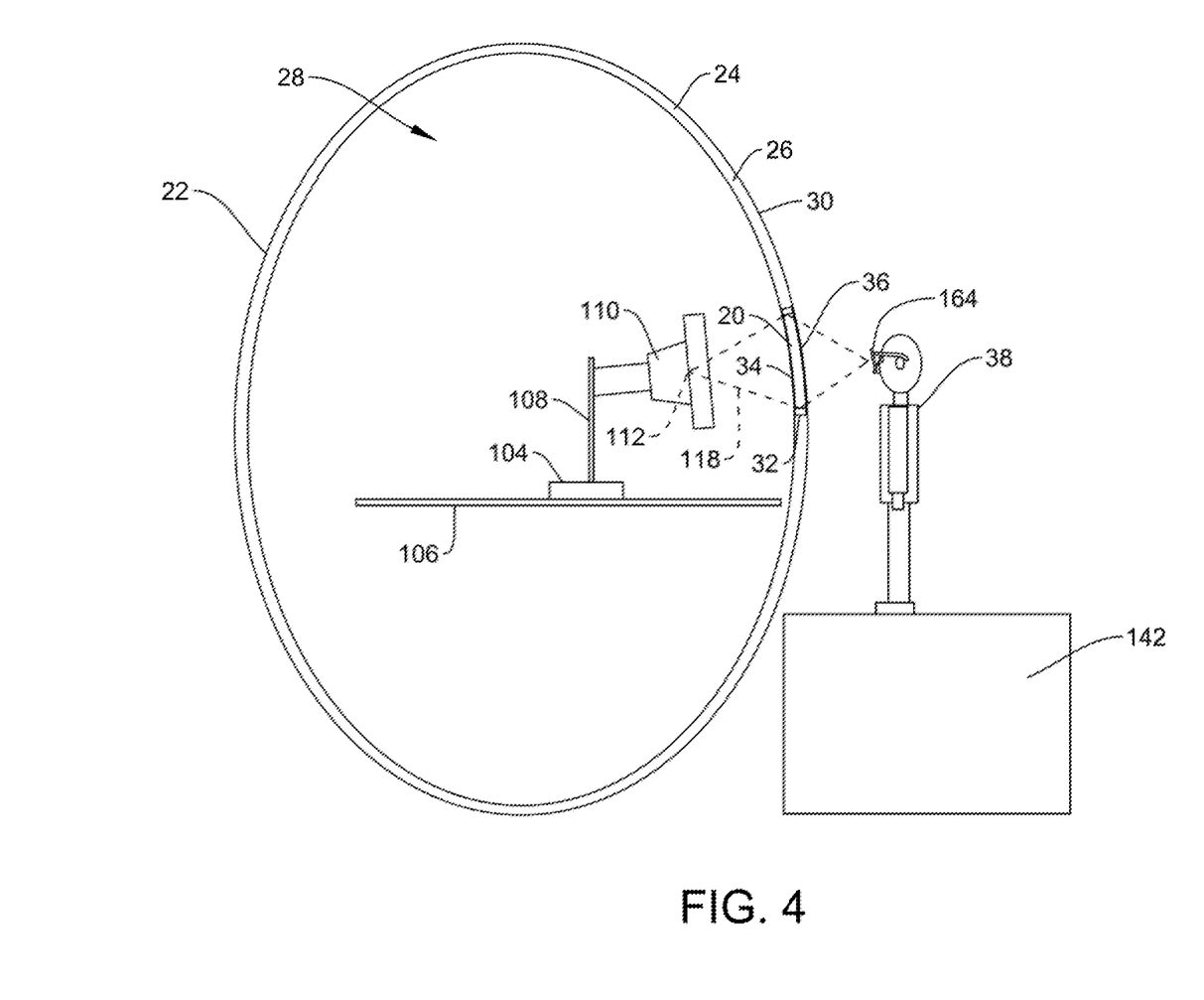
FIG. 4 is a cross-sectional view of an aircraft cabin depicting an embodiment of the present disclosure including a light source and polarizer in the interior directing light at the interior surface of a window, and the light shining through the window and being viewed by a person wearing a pair of polarized glasses.

As shown in FIGS. 3 and 4, system 100 may allow for direct viewing by a person 38 of image 160. Person 38 may view the image at exterior polarizer 154 as shown in FIG. 3. Alternatively, as shown in FIG. 4, person 38 may view singly-polarized light 118 emerging from exterior surface 36 of window 20 while wearing a pair of polarized glasses 164. In such use, interior light source 110 and interior polarizer 114 may be set up with a first angle 116 and polarized glasses 164 may polarize light at second angle 156 that is about 90° offset from first angle 116. For such direct viewing, the aircraft may be pressurized internally. Alternatively, hood 146 may include a viewing window in place of camera 162 and hood 146 may apply a negative pressure as described above for FIGS. 1 and 2. Hood 146 may in this case include the exterior polarizer internally or at the viewing window and person 38 may view that, or the exterior polarizer may be eliminated and person 38 may view window 20 using polarized glasses.

Examples of image 160 produced by system 100 are shown in FIGS. 1 and 5-8. Each image 160 reveals in its pattern the varying phase shifts produced at different areas of window 20 by the varying levels of stress on window 20. Images 160 as depicted herein are simplified from what will typically be seen in actual images to highlight the features of the pattern that are useful for analysis. FIGS. 1 and 5 show a typical image 160 for window 20 that is generally non-anomalous and is not pressurized. As noted above, cross-polarization of light would ideally reduce the intensity of light 158 to zero, but the presence of varying optical paths through window 20, caused, for example, by stress, results in a pattern in image 160. In a typical, non-anomalous, properly installed window the stress may produce a lined pattern as shown in FIGS. 1 and 5, with relatively widely-spaced and uniform lines 166. The lines are typically either horizontal as in FIG. 1 or vertical as in FIG. 5. Such lines may be seen to define a main stress axis 168 in the same direction as the lines. The stress as seen in FIGS. 1 and 5 may be caused, for example, by the pressure of window frame 32 on window 20 in holding the window in place.

As shown in FIG. 5, first angle 116 for interior polarizer 114 may nominally be set at about 45° relative to main stress axis 168. Second angle 156 for exterior polarizer 154 may nominally be set at about −45° relative to main stress axis 168, for a nominal offset between the angles of about 90°.

Figure 6:
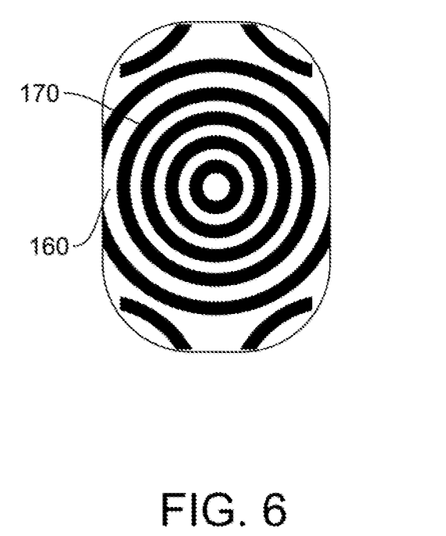
FIG. 6 is an illustration of an image, produced by cross-polarized light using an embodiment of the present disclosure, of a window under pressure from a vacuum hood or from pressurizing the aircraft cabin, and not depicting any anomalies and showing a typical pressurized stress pattern, with generally circular, wide-spaced, uniform lines, appearing as a target with the bullseye centered on the window.

FIG. 6 depicts a non-anomalous window 20, as in FIG. 5, with the application of pressure, either by pressurizing the aircraft cabin above relative ambient pressure or by applying a negative pressure, e.g., by use of vacuum hood 146. Under pressure, which may cause a deformation of the window, a typical image of a non-anomalous window is characterized by lines that are more closely spaced than the non-pressurized situation and with a generally uniform, concentric-circles pattern 170 like a target, generally centered in the window.

Figure 7:
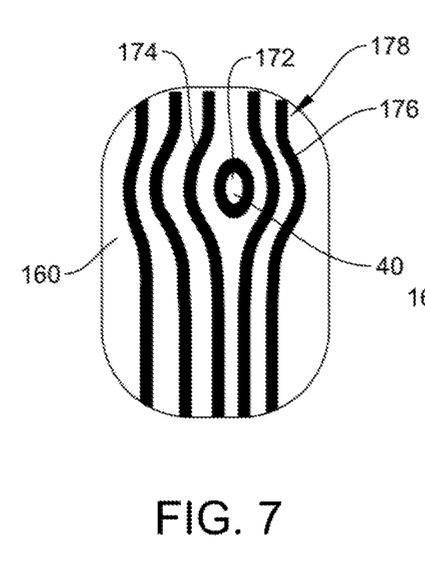
FIG. 7 is an illustration of an image, produced by cross-polarized light using an embodiment of the present disclosure, of a window depicting an anomaly producing a stress pattern around the anomaly with a roughly circular line surrounded by closer-spaced, curved lines.

FIG. 7 depicts image 160 for an anomalous window with an anomaly, for example, an inclusion, nick, or scratch 40. The location of anomaly 40 is typically at a center 172 of a deviation 174 in the pattern of lines and is also indicated by the lines being more closely spaced due to the increase in stress caused by the anomaly. Lines 176 in the area of the anomaly may change in direction around the area, creating a curved pattern 178 centered on the anomaly.

Figure 8:
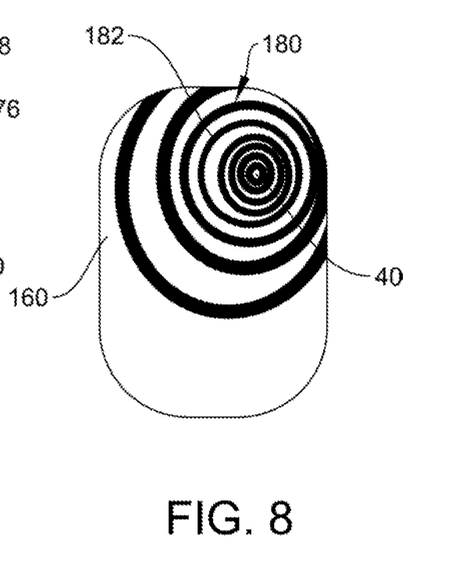
FIG. 8 is an illustration of an image, produced by cross-polarized light using an embodiment of the present disclosure, of a window under pressure from a vacuum hood or from pressurizing the aircraft cabin, and depicting an anomaly producing a stress pattern where the target pattern is skewed, the circular lines are more closely spaced, and the bullseye is offset from the center of the window to the location of the anomaly.

FIG. 8 depicts image 160 for the anomalous window similar to FIG. 7 with window 20 under pressure. Placing window 20 under pressure simulates the conditions of the window in flight and may aid in the detection of the anomaly because the pressure may produce a pattern 180 with lines 182 that are more closely spaced as compared either to the non-anomalous, pressurized image of FIG. 6 or to the anomalous, non-pressurized image of FIG. 7. The deformation from pressure typically will produce more defined lines around the anomaly and a non-uniform distribution of lines 180. Actual images may be more complex depending on stress in localized areas from anomalies and or installation stresses.

Referring back to FIG. 1, system 100 may further include an analysis subsystem 184 coupled to camera 162. Analysis subsystem 184 may be operable to receive and to analyze images 160 from camera 162 of light passing through exterior polarizer 154. Analysis subsystem 184 may include a computer 186 capable of acquiring and storing a database of information relating to light patterns for anomalous and non-anomalous windows.

Computer 186 may be configured with software for locating any anomalies in a window under test. System 100 may be used in acquiring a set of information on non-anomalous windows and anomalous windows of a particular type. This set of information may be analyzed for the range of possible patterns for the non-anomalous windows and the range of possible patterns for the anomalous windows. Such ranges may be used in developing a pre-determined threshold or reference standard for a particular type of window. Subsequent tests for anomalies in windows of that type may include comparing the image to the pre-determined threshold for the type of window. A window that fails the pre-determined threshold test may be immediately removed and replaced or further testing may be conducted. The set of information may also be analyzed for a range of nominal patterns for the non-anomalous windows. The nominal range may be used in developing a pre-determined nominal score for the particular type of window. Subsequent tests of windows may include comparing each image to the nominal score for the window type and placing the window on a watch list if the image is above the nominal score but below the pre-determined threshold.

As described above, interior subsystem 102 provides the light source and exterior subsystem 140 receives and analyzes the image of the double-polarized light. Alternatively, the functions of the interior and exterior subsystems may be swapped.

Figure 9:
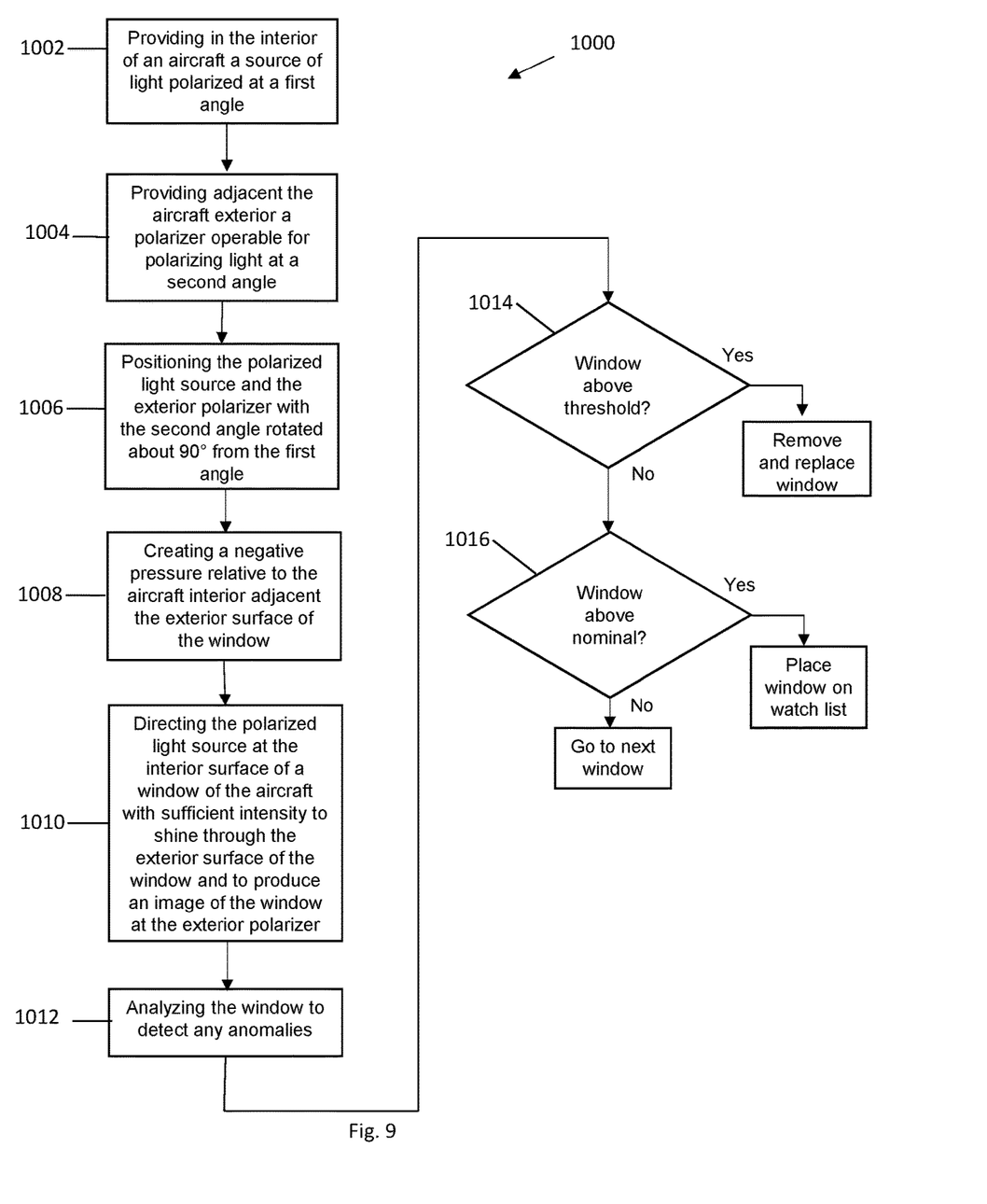
FIG. 9 is a flowchart depicting a method according to one or more embodiments of the present disclosure for inspecting and analyzing windows on an aircraft for anomalies.

A method 1000 for carrying out one or more embodiments of the present disclosure is depicted in the flowchart in FIG. 9. The method for carrying out inspection of window 20 installed on aircraft 22 includes a step 1002 of providing in aircraft interior 28 a source 110 of light polarized at a first angle 116. The method further includes a step 1004 of providing adjacent the aircraft exterior an exterior polarizer 154 operable for polarizing light from the exterior surface of the window at a second angle. The method then includes a step 1006 of positioning the polarized light source and the exterior polarizer relative to one another so that the second angle is rotated about 90-degrees relative to the first angle. Step 1006 may additionally include an option for adjusting the relative angle of the interior and exterior polarization. The method may include a step 1008 of creating a pressure differential between the aircraft interior and exterior, typically a negative pressure adjacent the exterior surface of the window relative to the interior of the aircraft. Step 1008 may be carried out by applying a vacuum hood adjacent the exterior surface of the aircraft window, and/or by pressurizing the aircraft using onboard systems. Step 1008 may be repeated cyclically to apply and remove the pressure differential.

The method may include a step 1010 of directing the polarized light source at the interior surface of the window with sufficient intensity to shine through the exterior surface of the window and to produce an image of the window at the exterior polarizer. The method then includes a step 1012 of analyzing the image of the window to detect any anomalies in the window. Step 1012 may be carried out, for example, by a person directly viewing the exterior polarizer, and optionally the exterior polarizer may be polarized glasses worn by the person. Step 1012 may be carried out by use of a camera receiving the image from the exterior polarizer and transmitting the image to a computer for automatic and/or manual analysis of the image. The method may include a step 1014 of checking if the window is above an acceptable threshold. Where the window is found to be above the threshold, the window may be subject to other testing of the window's integrity, and/or the window may be removed and replaced. The method may include a step 1016 of checking if window is above nominal and if so subjecting the window to other integrity tests, and/or placing the window on watch list for further subsequent inspection.

The negative pressure may be applied and held during the testing, or the pressure may be varied, for example, from ambient to the negative pressure repeatedly and images produced during the repeated pressure changes may be analyzed for anomalous patterns. As an example, the pressure may be varied in a sinusoidal pattern.

Referring back to FIGS. 1-3, system 100 may include measurement tool 150 that may aid in the adjustment of system parameters, such as the relative angle of the polarizers, and detection of anomalies in window 20. As noted above, the crossed-polarized light produced by system 100 for window 20 should have an intensity of zero, but due in part to stress on window 20, the intensity is not zero. However, the stress may be difficult to quantify by eye so measurement tool 150 may be inserted between window 20 and exterior polarizer 154. There are a number of measurement tools and methods that may be used in manners that will be understood by persons of ordinary skill.

One measurement tool is known as a compensator and is used to handle the phase shift in the light introduced by window 20. The compensator is an accessory plate with a variable optical path length. The optical path introduced by the compensator can be adjusted for the intensity of light 158 emerging from exterior polarizer 154 to be zero, which also indicates that the total phase-shift of the interior polarizer, window, and exterior polarizer is zero. From this the phase-shift in window 20 can be calculated because it is opposite to the variable phase-shift as set in the compensator. Use of this measurement tool may be automated. For example, light 118 emerging from window 20 may be sampled with camera 162 and the sampling information may be transmitted to computer 186. Such measurements may be done with different values for the compensating phase-shift. Out of these measurements the value for the phase-shift (which should give the minimum light intensity of zero) may be calculated in computer 186.

A particular type of compensator is known as de Senarmont has a high degree of sensitivity to differences in optical path length. This tool includes a quarter-wave plate which is used in combination with a rotating exterior polarizer 154 that gives at a certain angle of the exterior polarizer an intensity of zero. For automation, the exterior polarizer may be rotated, for instance with a stepping motor. Out of these intensities for different angles of the exterior polarizer, the optimal angle which should give a light intensity of zero may be computed.

A further type of measurement tool is a lambda plate. This tool includes a full-wave or lambda plate, which adds a constant phase shift of $2\pi$, e.g., 550 nm for green light, producing colored light dependent on the stress level. For automation, camera 162 transmits the colored light to computer 186 which compares the colors with references and calculates and reports the stress.

Another method of measurement tool is known as intensity or "fringes." Measuring the light intensity of the light gives directly the stress level (for high shifts the intensity variations are called "fringes"). In this method, the light intensity may be measured for cross-polarized light with the exterior polarizer offset 90° from the interior polarizer and measured again with the polarizers at 0°. The light intensity is first compensated for the intensity of light source 110 and the transmission of window 20, and after that the phase-shift is computed from this normalized light intensity.

The system as described above is operable for window 20 having a single pane of a glass or other transparent material. In the case of window 20 having two or more panes, including a structure where multiple panes are separated by one or more gas-filled space(s), the system may also be operable although more than one stress pattern may be visible. For example, a stress pattern may be visible for each pane. In such case, the system may be designed for focusing on, and analyzing the stress pattern for each pane, e.g., taking each pane serially. This may include adjusting the angle of one or both of the polarizers, adjusting the position and other parameters of the light source, and/or focusing the camera on each pattern in turn, and then analyzing the pattern for each pane.

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

I claim:

1. A system for inspecting an aircraft window installed on an aircraft, the aircraft defining an interior and an exterior, and the aircraft window defining an interior surface and an exterior surface, the system comprising:
   a. an interior subsystem operable in the aircraft interior, the interior subsystem including a light source and an interior polarizer, the light source and interior polarizer operable to direct light at the interior surface of the window with the light polarized at a first angle;
   b. an exterior subsystem operable adjacent the aircraft exterior, the exterior subsystem including an exterior polarizer, the exterior polarizer operable for polarizing light from the exterior surface of the window at a second angle;
   wherein the polarizer of the exterior subsystem is operable in a nominal position in which the second angle is rotated relative to the first angle and further wherein the light source produces light that shines through the exterior surface of the window and to produce an image at the exterior polarizer.

2. The system of claim 1, wherein the exterior subsystem further includes a camera directed at the exterior polarizer.

3. The system of claim 1, wherein the exterior subsystem further includes a vacuum hood encompassing the exterior polarizer.

4. The system of claim 3, wherein the vacuum hood is operable to produce a pressure differential between a pressure in the aircraft interior and a pressure at the exterior surface of the window wherein the pressure in the aircraft interior is at least about one pound per square inch (PSI) greater than the pressure at the exterior surface of the window.

5. The system of claim 3, wherein the vacuum hood is operable to produce a pressure differential between a pressure in the aircraft interior and a pressure at the exterior surface of the window wherein the pressure in the aircraft interior is no more than about two PSI greater than the pressure at the exterior surface of the window.

6. The system of claim 1, further wherein the interior and exterior subsystems are operable while the aircraft interior is pressurized to at least about one PSI greater than the aircraft exterior.

7. The system of claim 1, wherein the exterior subsystem includes a measurement tool between the exterior surface of the window and the exterior polarizer, the measurement tool operable to measure the intensity of light shining through the exterior surface of the window.

8. The system of claim 1 for use with the aircraft window wherein the window defines a main stress axis, and further wherein the interior polarizer is operable to polarize light at about 45-degrees relative to the main stress axis.

9. The system of claim 1, wherein at least one of the interior polarizer and the exterior polarizer are rotatable about an axis perpendicular to the surfaces of the window to change at least one of the first and second angles of polarization of light.

10. A system for inspecting an aircraft window installed on an aircraft, the aircraft defining an interior and an exterior, and the aircraft window defining an interior surface and an exterior surface substantially parallel to the interior surface, the system comprising:
   a. an interior subsystem operable in the aircraft interior, the interior subsystem including a light source and an interior polarizer, the light source and interior polarizer operable to direct polarized light at the interior surface of the window to shine through the exterior surface of the window, the interior polarizer further operable to polarize light at a first angle;
   b. an exterior subsystem operable adjacent the aircraft exterior, the exterior subsystem including an exterior polarizer and a camera, the exterior polarizer operable for polarizing light from the exterior surface of the window at a second angle, and wherein the camera is directed at the exterior polarizer and receives an image produced by the polarized light passing through the exterior polarizer;
   wherein the polarizer of the exterior subsystem is operable in a nominal position in which the second angle is rotated about 90-degrees relative to the first angle.

11. The system of claim 10 further comprising an analysis subsystem coupled to the camera, the analysis subsystem operable to receive and to analyze the image from the camera of light passing through the exterior polarizer.

12. The system of claim 10, wherein the exterior subsystem further includes a vacuum hood encompassing the exterior polarizer and the camera, the vacuum hood operable to produce a pressure differential between a pressure in the aircraft interior and a pressure at the exterior surface of the window wherein the pressure in the aircraft interior is greater than the pressure at the exterior surface of the window.

13. The system of claim 10, wherein the exterior subsystem includes a measurement tool between the exterior surface of the window and the exterior polarizer, the measurement tool operable to measure the intensity of light shining through the exterior surface of the window.

14. The system of claim 10, wherein at least one of the interior polarizer and the exterior polarizer are rotatable about an axis perpendicular to the surfaces of the window to change at least one of the first and second angles of polarization of light.

15. A method for inspecting an aircraft window installed on an aircraft, the aircraft defining an interior and an exterior, and the aircraft window defining an interior surface and an exterior surface, the method comprising the steps of:
   a. providing in the aircraft interior a source of light polarized at a first angle and directed at the interior surface of the aircraft window;
   b. providing exterior to the aircraft an exterior polarizer, the exterior polarizer positioned adjacent the exterior surface of the window and operable for polarizing light from the exterior surface of the window at a second angle;
   c. positioning the polarized light source and the exterior polarizer relative to one another so that the second angle is rotated about 90-degrees relative to the first angle;
   d. directing the polarized light source at the interior surface of the window to shine through the exterior surface of the window and to produce an image of the window at the exterior polarizer;
   e. analyzing the image of the window to detect any anomalies in the window.

16. The method of claim 15 further comprising a step of creating a pressure differential between a pressure in the interior of the aircraft and a pressure at the exterior surface of the window, wherein the pressure in the aircraft interior is greater than the pressure at the exterior surface of the window by at least about one pound per square inch (PSI).

17. The method of claim 16 wherein the step of creating a pressure differential includes varying the pressure differential repeatedly and wherein the step of analyzing the image includes analyzing changes in the image during the varying of the pressure differential.

18. The method of claim 15 further comprising steps of providing a camera adjacent to the exterior polarizer; directing the camera at the image at the exterior polarizer; and recording the image with the camera, and wherein the step of analyzing the image includes analyzing the image as recorded by the camera.

19. The method of claim 15 further comprising a step of developing a pre-determined threshold for the window and wherein the step of analyzing the image includes comparing the image to the pre-determined threshold for the window.

20. The method of claim 15 further wherein the exterior polarizer is polarized glasses and wherein the step of analyzing the image includes a person looking at the image through the polarized glasses.

* * * * *